United States Patent
Cherp et al.

(10) Patent No.: US 12,476,993 B1
(45) Date of Patent: Nov. 18, 2025

(54) DETECTION AND PREVENTION OF ADVERSARIAL ATTACKS AGAINST LARGE LANGUAGE MODELS

(71) Applicant: CyberArk Software Ltd., Petach-Tikva (IL)

(72) Inventors: Mark Cherp, Ramat-Gan (IL); Eran Shimony, Ramat-Gan (IL); Niv Rabin, Petach-Tikva (IL)

(73) Assignee: CyberArk Software Ltd., Petach-Tikva (IL)

( * ) Notice: Subject to any disclaimer, the term of this patent is extended or adjusted under 35 U.S.C. 154(b) by 0 days.

(21) Appl. No.: 19/006,418

(22) Filed: Dec. 31, 2024

(51) Int. Cl.
*H04L 9/40* (2022.01)

(52) U.S. Cl.
CPC ...... *H04L 63/1425* (2013.01); *H04L 63/1416* (2013.01)

(58) Field of Classification Search
CPC .................. H04L 63/1425; H04L 63/1416
USPC .............................................. 726/23
See application file for complete search history.

(56) References Cited

U.S. PATENT DOCUMENTS

| | | | | |
|---|---|---|---|---|
| 12,061,970 B1 * | 8/2024 | Lo | ............ | G06N 3/10 |
| 12,210,949 B1 * | 1/2025 | Silver | ............ | G06N 20/20 |
| 12,355,807 B2 * | 7/2025 | Murphy | ............ | G06F 21/552 |
| 2023/0396641 A1 * | 12/2023 | Hebbagodi | ......... | H04L 63/1408 |
| 2024/0296219 A1 * | 9/2024 | Gardner | ............ | G06F 16/90332 |
| 2024/0385814 A1 | 11/2024 | Fu et al. | | |
| 2024/0403560 A1 * | 12/2024 | Radu | ............ | G06F 40/284 |
| 2024/0414191 A1 * | 12/2024 | Humphrey | ......... | H04L 63/1433 |
| 2025/0016183 A1 * | 1/2025 | Sergeev | ............ | H04L 63/1441 |
| 2025/0036871 A1 | 1/2025 | Rivain et al. | | |
| 2025/0045531 A1 * | 2/2025 | Hayes | ............ | G06F 40/56 |
| 2025/0062003 A1 | 2/2025 | Alkhatib et al. | | |
| 2025/0111147 A1 * | 4/2025 | Pryzant | ............ | G06F 40/56 |
| 2025/0117482 A1 * | 4/2025 | Bazalgette | ............ | H04L 63/20 |
| 2025/0181836 A1 * | 6/2025 | Mehrotra | ............ | G06F 21/577 |
| 2025/0209312 A1 * | 6/2025 | Crabtree | ............ | G06N 3/0475 |

OTHER PUBLICATIONS

U.S. Appl. No. 19/006,437, filed Dec. 31, 2024.
Khadka, Pranjal; "Paper Breakdown: Root Mean Square Layer Normalization"; Medium; Apr. 23, 2024 (11 pages).

* cited by examiner

*Primary Examiner* — Badri Narayanan Champakesan
(74) *Attorney, Agent, or Firm* — Finnegan, Henderson Farabow, Garrett & Dunner

(57) ABSTRACT

Systems, methods, and apparatuses are disclosed for detection and prevention of adversarial attacks against large language models. Techniques may include receiving an input associated with a target large language model, analyzing the input with a pre-trained classification algorithm to determine a first deconstruction process to be applied to the input, and modifying the input with a first deconstruction model using the determined first deconstruction process. Techniques may also include determining a score of a likelihood of the input being adversarial based on an output of the first deconstruction model and by applying a classification model and updating at least one of the first deconstruction model or the classification model based on the score.

18 Claims, 10 Drawing Sheets

300

900

DETECTION AND PREVENTION OF ADVERSARIAL ATTACKS AGAINST LARGE LANGUAGE MODELS

BACKGROUND

Technical Field

The present disclosure relates generally to cybersecurity, and more specifically, to techniques for detection and prevention of adversarial attacks and other compromises against large language models.

Background Information

Modern Large Language Models (LLMs) such as ChatGPT™, Claude™ Microsoft Copilot™, Gemini™, and Meta AI™ employ artificial intelligence (AI) models that perform natural language processing tasks such as generating and translating text, answering questions, and summarizing text. Adversarial attacks against LLMs have seen a rapid rise, coinciding with the popularity of modern LLMs. These attacks, often referred to as "jailbreaks," aim to exploit the models' knowledge and reasoning capabilities to generate harmful content. Such content can potentially be used for various illegal or unethical purposes.

LLMs employ alignment mechanisms during training to prevent generating harmful responses to harmful or malformed prompts. Additionally, LLM developers often implement content moderation systems to identify nefarious prompts based on keywords or context. These systems may reference known adversarial attack databases containing prompts or inputs flagged as malicious or harmful. However, current alignment mechanisms and content moderation systems are unsatisfactory to prevent most sophisticated jailbreak attempts and other vulnerabilities.

Solutions are needed to secure LLMs from malicious attacks or jailbreak attempts and other forms of attack. Solutions should include analyzing a prompt to a LLM with a pre-trained classification algorithm to determine a first deconstruction process to be applied to the input. A deconstruction process is applied to the input and may transform the input into another form for analysis by a classification model. By analyzing the modified input, the classification model may uncover or detect a jailbreak attempt that has been disguised to circumvent existing security measures. Solutions may also include applying a deconstruction model to an output of the large language model and analyzing the modified output with a classification model. Such solutions may further improve an ability to uncover output that is harmful or output that stems from a jailbreak attempt. Further, solutions should provide for continuous updating of a deconstruction model or a classification model to continuously insulate a LLM from refinements in jailbreak attempt techniques and other forms of vulnerability.

Solutions are also needed to continuously insulate LLMs or other Generative Adversarial Networks (GANs) from refined attacks. Solutions should include iterative or sequential mutations of prompts to a target LLM and its adversarial detection systems. Responses should be evaluated to determine whether they defeat the detection system and those responses should be updated and stored in a dataset. Solutions should further include immunizing LLMs or GANs with prompts and prompt mutations found to produce successful jailbreaks in response to trigger events.

SUMMARY

The disclosed embodiments describe non-transitory computer readable media, systems, and methods for detection and prevention of adversarial attacks against large language models. For example, in an embodiment, a non-transitory computer readable medium may include instructions that, when executed by at least one processor, cause the at least one processor to perform operations for detection and prevention of adversarial attacks against large language models. The operations may include receiving an input associated with a target large language model, analyzing the input with a pre-trained classification algorithm to determine a first deconstruction process to be applied to the input, and modifying the input with a first deconstruction model using the determined first deconstruction process. The operations may further include determining a score of a likelihood of the input being adversarial based on an output of the first deconstruction model and by applying a classification model and updating at least one of the first deconstruction model or the classification model based on the score.

According to a disclosed embodiment, the input may include a prompt. In another embodiment, the first deconstruction process may include at least one of rephrasing the prompt, refocusing a detection model, employing substitutions in the prompt, or unmasking the prompt. In another embodiment, rephrasing the prompt may include summarizing the prompt or adjusting a sentiment of the prompt. In yet another embodiment, refocusing the detection model may include comparing the prompt to a previous jailbreak attempt, hardening the detection model, or periodically updating the detection model. In another embodiment, employing substitutions in the prompt may include one or more of semantic mapping, token substitution, or translation of the prompt. In another embodiment, unmasking the prompt may include one or more of decoding the prompt, reconstructing an original structure of the prompt, or analyzing an entropy of the prompt.

According to a disclosed embodiment, applying the classification model may include one or more of comparing a prompt embedding against a set of external embeddings, analyzing the modified prompt with a second large language model, or performing a sentiment analysis of the modified prompt. According to a disclosed embodiment, the target large language model may be a multi-modal large language model.

According to a disclosed embodiment, the operations may further include receiving an output from the target large language model, and analyzing the output with a pre-trained classification algorithm to determine a second deconstruction process to be applied to the output. In an embodiment, the operations may further comprise modifying the output with a second deconstruction model using the determined second deconstruction process. In another embodiment, the operations may further include determining a score of a likelihood of the output being adversarial based on an output of the second deconstruction model and an output classification model. In yet another embodiment, the operations may further include updating one of the second deconstruction model or the output classification model based on the score of a likelihood of the output being adversarial.

According to a disclosed embodiment, a computer-implemented method for detection and prevention of adversarial attacks against large language models may include receiving an input associated with a target large language model, analyzing the input with a pre-trained classification algorithm to determine a first deconstruction process to be applied to the input, and modifying the input with a first deconstruction model using the determined first deconstruction process. In an embodiment, the method may further include transmitting the modified input to the target large language model, receiving an output from the target large language model, analyzing the output with a second pre-trained classification algorithm to determine an output deconstruction process to be applied to the output, and modifying the output with an output deconstruction model using the determined output deconstruction process.

According to a disclosed embodiment, the method may further include determining a score of a likelihood of the input being adversarial based on an output of the output deconstruction model and by applying a classification model, and updating one of the input manipulation model or the classification model based on the score.

According to a disclosed embodiment, the output deconstruction process may include at least one of rephrasing the output, refocusing a detection model, employing substitutions in the output, or unmasking the output. In another embodiment, rephrasing the output may include summarizing the output or adjusting the sentiment of the output. In yet another embodiment, refocusing the detection model may include comparing the output to a previous jailbreak attempt, hardening the detection model, or periodically updating the detection model. In another embodiment, employing substitutions in the output may include one or more of semantic mapping, token substitution, or translation of the output. In yet another embodiment, unmasking the output includes one or more of decoding the output, reconstructing an original structure of the output, or analyzing an entropy of the output.

According to a disclosed embodiment, applying the classification model includes one or more of comparing the modified output embedding against a set of external embeddings, analyzing the modified output with a second large language model, or performing a sentiment analysis of the modified output.

According to a disclosed embodiment, a non-transitory computer readable medium may include instructions that, when executed by at least one processor, cause the at least one processor to perform operations for immunization of large language models against adversarial attacks. The operations may comprise providing a prompt from an adversarial prompts dataset to a prompt mutator; generating a plurality of prompt mutations based on the prompt; providing one or more of the plurality of prompt mutations to a target large language model; evaluating an output of the target large language model with a classification model; and updating the adversarial prompts dataset based on the evaluation. In another embodiment, evaluating the output of the target large language model with a classification model may also include determining a score of a likelihood of the prompt being adversarial.

According to a disclosed embodiment, the operations may further comprise updating the adversarial prompts dataset with a new adversarial prompt upon an immunization trigger event. In an embodiment, the immunization trigger event may comprise one of a time interval, a threshold of jailbreak attacks against the target large language model, or an external dataset update. In another embodiment, the operations may further include immunizing the target large language model against the new adversarial prompt. According to a disclosed embodiment, immunizing the target large language model may include hooking the model for layer introspection. According to another disclosed embodiment, immunizing the target large language model may include evaluating a refusal tendency of each layer in the model by decoding each layer in the mode, recording a probability for all known refusal tokens for each layer; and identifying layers where the probability is below a threshold value. In yet another embodiment, immunizing the target large language model may include strengthening the identified layers by adjusting values of the output of each layer.

According to a disclosed embodiment, generating a plurality of prompt mutations based on the prompt may include providing the prompt to a non-target large language model with an adversarial persuasion request. In another embodiment, generating a plurality of prompt mutations based on the prompt may include providing the prompt to a non-target large language model with an adversarial suffix.

According to a disclosed embodiment, evaluating the output of the target large language model with a classification model may include one or more of comparing the output embedding against a set of external embeddings, analyzing the output with a second large language model, or performing a sentiment analysis of the output. In an embodiment, the prompt may be generated by a fuzzer.

According to a disclosed embodiment, there may be a computer-implemented method for immunization of large language models against adversarial attacks. The method may comprise providing a prompt from an adversarial prompts dataset to a prompt mutator; generating a plurality of prompt mutations based on the prompt; providing one or more of the plurality of prompt mutations to a target large language model; evaluating an output of the target large language model with a classification model; and updating the adversarial prompts dataset based on the evaluation. In another embodiment, evaluating the output of the target large language model with a classification model may also include determining a score of a likelihood of the prompt being adversarial. According to a disclosed embodiment, the method may be repeated with a second prompt.

According to a disclosed embodiment, evaluating the output of the target large language model with the classification model may include employing a non-target large language model as a judge. In another embodiment, evaluating the output of the target large language model with the classification model may include performing a semantic analysis with a deep learning model.

According to a disclosed embodiment, the method may further include updating the classification model. In another embodiment, immunizing the target large language model or updating the classification model may include generating updated training data for at least one of the target large language model or the classification model. In an embodiment, the updated training data may be generated by a machine learning algorithm.

According to a disclosed embodiment, the method may further comprise immunizing the target large language model with a new adversarial prompt upon an immunization trigger event. In another embodiment, generating the plurality of prompt mutations includes providing the prompt to a non-target large language model with an adversarial persuasion request and an adversarial suffix.

Aspects of the disclosed embodiments may include tangible computer readable media that store software instructions that, when executed by one or more processors, are configured for and capable of performing and executing one or more of the methods, operations, and the like consistent with the disclosed embodiments. Also, aspects of the disclosed embodiments may be performed by one or more processors that are configured as special-purpose processor(s) based on software instructions that are programmed with logic and instructions that perform, when executed, one or more operations consistent with the disclosed embodiments.

It is to be understood that both the foregoing general description and the following detailed description are exemplary and explanatory only and are not restrictive of the disclosed embodiments.

DETAILED DESCRIPTION

Figure 1:
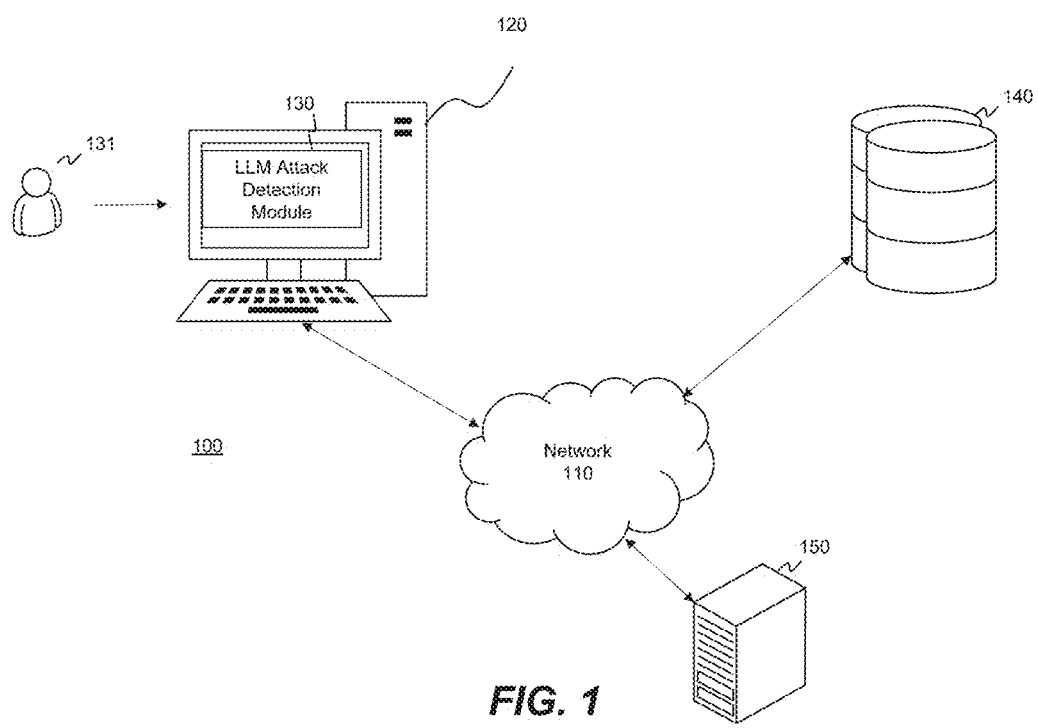
FIG. 1 is a block diagram of an exemplary system for detection and prevention of adversarial attacks against large language models in accordance with disclosed embodiments.

In the following detailed description, numerous specific details are set forth to provide a thorough understanding of the disclosed example embodiments. However, it will be understood by those skilled in the art that the principles of the example embodiments may be practiced without every specific detail. Well-known methods, procedures, and components have not been described in detail so as not to obscure the principles of the example embodiments. Unless explicitly stated, the example methods and processes described herein are not constrained to a particular order or sequence or constrained to a particular system configuration. Additionally, some of the described embodiments or elements thereof can occur or be performed simultaneously, at the same point in time, or concurrently.

The techniques described herein overcome several technological problems related to security, efficiency, and functionality in the fields of cybersecurity, network security, and software management. In particular, the disclosed embodiments provide techniques for detection and prevention of adversarial attacks against large language models and for immunizing models from future attacks. As discussed above, existing techniques may be unsatisfactory for continued prevention of modern jailbreaking techniques, and other vulnerabilities, leading to LLMs generating harmful content.

The disclosed embodiments provide technical solutions to these and other problems arising from current techniques. For example, solutions may employ a multi-stage input task classification, manipulation, detection and scoring system. A deconstruction process may be applied to an LLM input and may transform the input into another form for analysis by a classification model. By analyzing the modified input, the classification model may uncover or detect a jailbreak attempt or other threat that has been disguised to circumvent exiting security measures. Solutions may also include applying a deconstruction model to an output of the large language model and analyzing the modified output with a classification model. Such solutions may further uncover output that is harmful and stems from a jailbreak attempt. Disclosed techniques for establishing secure access between network identities may further be combined with security monitoring and/or enforcement programs. For these, and other reasons that will be apparent to those skilled in the art, the disclosed techniques provide improved security, performance, and efficiency over existing techniques.

Aspects of the present disclosure may include large language models. A large language model (LLM) may be an artificial intelligence (AI) model that can perform natural language processing (NLP) tasks, such as generating and translating text, answering questions, and summarizing text: LLMs may be trained on large amounts of data, often billions of words, to learn statistical relationships and patterns in language. LLMs may be based on deep learning architectures and are also known as neural networks (NNs). LLMs may be trained to perform a variety of tasks, for example, writing software code, text classification, question answering, and document summarization.

Aspects of the present disclosure may include detecting and protecting against jailbreak attempts against LLMs. A jailbreak attempt against an LLM may be an intentional effort to bypass the model's built-in safety measures and restrictions. The goal is to manipulate the model into generating outputs that violate its intended purpose or safety guidelines. This can involve producing harmful, inappropriate, or unauthorized content. Jailbreak attacks often use sophisticated methods like prompt engineering or adversarial attacks. These techniques craft specific inputs designed to exploit vulnerabilities in the model's processing. For example, a jailbreak attempt may include chatbots being tricked into swearing, making inappropriate comments, or providing incorrect information, among various other possibilities.

Reference will now be made in detail to the disclosed embodiments, examples of which are illustrated in the accompanying drawings.

FIG. 1 illustrates an example system environment 100 for detection and prevention of adversarial attacks against large language models. System environment 100 may include one or more computing devices 120, one or more LLM attack detection modules 130, one or more target resources 140, and one or more servers 150, as shown in FIG. 1. System environment 100 may represent a system or network environment in which a user may seek to submit an input to a large language model. In the example of system environment 100, network identity 131 may be operating computing device 120 to submit input to a large language model residing on server 150 or another location on network 110.

The various components of system environment 100 may communicate over a network 110. Such communications may take place across various types of networks, such as the Internet, a wired Wide Area Network (WAN), a wired Local Area Network (LAN), a wireless WAN (e.g., WiMAX), a wireless LAN (e.g., IEEE 802.11, etc.), a mesh network, a mobile/cellular network, an enterprise or private data network, a storage area network, a virtual private network using a public network, a nearfield communications technique (e.g., Bluetooth™, infrared, etc.), or various other types of network communications. In some embodiments, the communications may take place across two or more of these forms of networks and protocols. While system environment 100 is shown as a network-based environment, it is understood that in some embodiments, one or more aspects of the disclosed systems and methods may also be used in a localized system, with one or more of the components communicating directly with each other.

As noted above, system environment 100 may include one or more computing devices 120. Computing device 120 may include any device that may be used for submitting data to a large language model. Accordingly, computing device 120 may include various forms of computer-based devices, such as a workstation or personal computer (e.g., a desktop or laptop computer), a mobile device (e.g., a mobile phone or tablet), a wearable device (e.g., a smart watch, smart jewelry, implantable device, fitness tracker, smart clothing, head-mounted display, etc.), an IoT device (e.g., smart home devices, industrial devices, etc.), or any other device that may be capable of performing a privileged computing operation. In some embodiments, computing device 120 may be a virtual machine (e.g., based on AWS™, Azure™, IBM Cloud™, etc.), container instance (e.g., Docker™ container, Java™ container, Windows Server™ container, etc.), or other virtualized instance.

In some embodiments, computing device 120 may be associated with a network identity 131. Network identity 131 may be any entity that may be associated with one or more privileges to be asserted to perform a privileged computing operation. For example, network identity 131 may be a user, an account, an application, a process, an operating system, a service, an electronic signature, or any other entity or attribute associated with one or more components of system environment 100. In some embodiments, network identity 131 may be associated with a user requesting to submit data to a large language model, which may include a large language model residing on server 150.

System 100 may include database 140. For example, database 140 may include SQL servers, databases or data structures holding confidential information, restricted-use applications, operating system directory services, access-restricted cloud-computing resources (e.g., an AWS™ or Azure™ server), sensitive IoT equipment (e.g., physical access control devices, video surveillance equipment, etc.) and/or any other computer-based equipment or software that may be accessible over a network. Database 140 may also be a repository for storing known adversarial prompts for use in jailbreak attempts. Database 140 may include various other forms of computing devices, such as a mobile device (e.g., a mobile phone or tablet), a wearable device (a smart watch, smart jewelry, implantable device, fitness tracker, smart clothing, or head-mounted display, etc.), an IoT device (e.g., a network-connected appliance, vehicle, lighting, thermostat, room access controller, building entry controller, parking garage controller, sensor device, etc.), a gateway, switch, router, portable device, virtual machine, or any other device that may be subject to privileged computing operations. In some embodiments, database 140 may be a privileged resource, such that access to the database 140 may be limited or restricted. For example, access to the database 140 may require a secret (e.g., a password, a username, an SSH key, an asymmetric key, a symmetric key, a security or access token, a hash value, biometric data, personal data, etc.). In some embodiments database 140 may not necessarily be a separate device from computing device 120 and may be a local resource. Accordingly, database 140 may be a local hard drive, database, data structure, or other resource integrated with computing device 120.

System 100 may also comprise one or more server device(s) 150 in communication with network 110. Server device 150 may manage the various components in system 100. In some embodiments, server device 150 may be configured to process and manage requests between computing devices 130 and/or database 140. In another embodiment, server device 150 may include a target large language model.

LLM attack detection module 130 may be any device, component, program, application, script, or the like, for detecting and preventing adversarial attacks against LLMs within system 100, as described in more detail below. LLM attack detection module 130 may be configured to monitor components within system 100, including computing device 120, and may communicate with database 140 or server 150. In some embodiments, LLM attack detection module 130 may be implemented as a separate component within system 100, capable of detecting and preventing adversarial attacks against LLMs within network 110. In other embodiments, LLM attack detection module 130 may be a program or script and may be executed by another component of system 100 (e.g., integrated into computing device 130, database 140, server 150), or another component.

Figure 2:
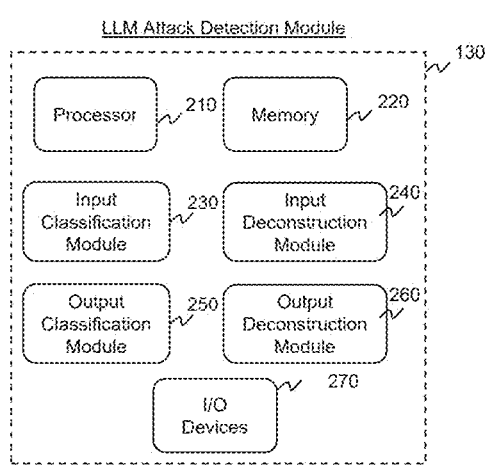
FIG. 2 is a block diagram showing an exemplary large language model attack detection module in accordance with disclosed embodiments.

LLM attack detection module 130 may comprise additional elements to detect and prevent adversarial attacks against LLMs within system 100. FIG. 2 is a block diagram showing an exemplary LLM attack detection module 130 in accordance with disclosed embodiments. For example, LLM attack detection module 130 may be a computing device and may include one or more dedicated processors 210 and/or memories 220. Processor (or processors) 210 may include one or more data or software processing devices. For example, the processor 210 may take the form of, but is not limited to, a microprocessor, embedded processor, or the like, or may be integrated in a system on a chip (SoC). Furthermore, according to some embodiments, the processor 210 may be from the family of processors manufactured by Intel®, AMD®, Qualcomm®, Apple®, NVIDIA®, or the like. The processor 210 may also be based on the ARM architecture, a mobile processor, or a graphics processing unit, etc. In some embodiments LLM attack detection module 130 may be employed as a cloud service, such as a Software as a Service (SaaS) system, a Platform as a Service (PaaS), or Infrastructure as a Service (IaaS) system. For example, LLM attack detection module 130 may be based on infrastructure of services of Amazon Web Services™ (AWS™), Microsoft Azure™, Google Cloud Platform™, Cisco Metapod™, Joyent™, vmWare™, or other cloud computing providers. In an embodiment, LLM attack detection module 130 may be integrated with a host that operates as a node in a cluster, for example, a Kubernetes™ node, and the node may further include software instance environments such as containers. In another embodiment, LLM attack detection module 130 may be a container deployed on a node, or it may be deployed in a layer separate from software containers. In another embodiment, LLM attack detection module 130 is a software application running on computing device 120.

Memory (or memories) 220 may include one or more storage devices configured to store instructions or data used by the processor 210 to perform functions related to the disclosed embodiments. Memory 220 may be configured to store software instructions, such as programs, that perform one or more operations when executed by the processor 210 to detect and prevent adversarial attacks against LLMs, for example, using process 300 or 600, as described in detail below. The disclosed embodiments are not limited to software programs or devices configured to perform dedicated tasks. For example, the memory 220 may store a single program, such as a user-level application, which performs the functions of the disclosed embodiments or may comprise multiple software programs. Additionally, the processor 210 may in some embodiments execute one or more programs (or portions thereof) remotely located from the computing device 120. Furthermore, the memory 220 may include one or more storage devices configured to store data (e.g., machine learning data, training data, algorithms, etc.) for use by the programs, as discussed further below.

LLM attack detection module 130 may further comprise one or more components for performing various operations of the disclosed embodiments. For example, LLM attack detection 130 may include input classification module 230, input deconstruction module 240, output classification module 250, and output deconstruction module 260. Input classification module 230 may be configured to analyze an input to a LLM with a pre-trained classification algorithm to determine a first deconstruction process to be applied to the input. For example, input classification module 230 may be configured to receive am input from network identify 131, computing device 120, target resource 140, or server 150 and determine a deconstruction process to be applied to the input. In some embodiments, input deconstruction module 240 may apply the determined deconstruction process to the input. In another embodiment, output classification module 250 may determine a deconstruction process to be applied to an output from the large language model. In another embodiment, output deconstruction module 260 may apply the determined deconstruction process to the output.

LLM attack detection module 130 may include one or more input/output (I/O) devices 270. I/O devices 270 may include one or more network adaptors or communication devices and/or interfaces (e.g., Wi-Fi, Bluetooth®, RFID, NFC, RF, infrared, Ethernet, etc.) to communicate with other machines and devices, such as with other components of system 100 through network 110. For example, LLM attack detection module 130 may use a network adaptor to identify applications stored within system 100. In some embodiments, the I/O devices 270 may also comprise a touchscreen configured to allow a user to interact with input classification module 230, input deconstruction module 240, output classification module 250, and output deconstruction module 260 and/or an associated computing device. The I/O devices 270 may comprise a keyboard, mouse, trackball, touch pad, stylus, and the like. Like processor 210 and memory 220, in embodiments where LLM attack detection module 120 is executed as software or code, I/O devices 270 may be associated with another component of system 100.

Aspects of the present disclosure may include receiving an input associated with a target large language model. An input may include text, an image, or other form of data. An input may be generated by a user associated with a network identity, such as network identity 131. In an embedment, input may be generated by an automated system. An input may contain a prompt for a large language model to generate a response. In some embodiments, the prompt may be an adversarial prompt designed to exploit vulnerabilities in the target LLM.

Receiving an input may refer to any method of transmitting data from one entity to another entity. In an embodiment, the prompt may be generated by network identity 131 and may be received by LLM attack detection module 130 over network 110. The input may be associated with a target large language model. For example, the input may be text in the form of a query seeking an output from a specific large language module in response to the query. Of course, other inputs may be used other than text data, such as code, dialogue, structured data such as tables or databases, or multimodal data such as images, audio, or video data. In an embodiment, the prompt may be a multi-nodal prompt combining multiple types of data, such as text, images, audio, or video. In another embodiment, the target LLM may be a multi-modal LLM that may, for example, analyze and generate descriptions of images, or create images based on textual descriptions, transcribe spoken language into text, generate spoken language from text, or understand and respond to audio inputs; or may understand video content, generate video descriptions, or create video content based on textual input.

Figure 3:
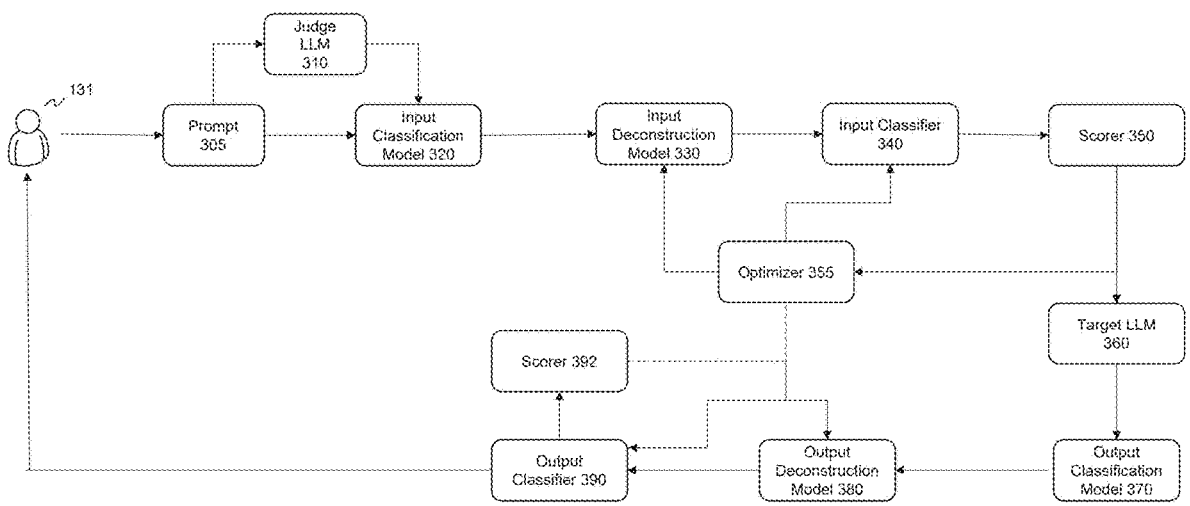
FIG. 3 is a diagram depicting an exemplary process for detection and prevention of adversarial attacks against large language models in accordance with disclosed embodiments.

FIG. 3 depicts an exemplary process for detection and prevention of adversarial attacks against large language models in accordance with disclosed embodiments. In an embodiment, network identity 131 may generate a prompt 305 associated with a target LLM 360. The prompt may be received by a component, such as input classification module 230 of LLM attack detection model 130, and the prompt 305 may be analyzed by an input classification model 320. Input classification model 320 may be a pre-trained classification algorithm to determine a deconstruction process to be applied to the input.

Aspects of the present disclosure may include analyzing the input with a pre-trained classification algorithm. A classification algorithm may refer to a machine learning (also referred to here as AI) algorithm used to assign labels to data points based on certain features and may be used to categorize data, such as the input, into a predefined class. Example classification algorithms may include logistic regression algorithms used for binary classification problems; decision trees or models that split data into branches to make decisions; Support Vector Machines (SVM); K-Nearest Neighbors (KNN); neural networks, or any other types of classification algorithm. In an embodiment, analyzing the input with a pre-trained classification algorithm may include determining the input's task nature and structure. For example, an input may request a summary, an explanation, or an analysis, and the classification algorithm may determine the appropriate type of output desired by the input. In another example, the classification algorithm may examine the input's structure, for example, determine whether the input is text, code, a document, a photo, an audit log, or other type.

In some embodiments, the pre-trained classification algorithm may determine a first deconstruction process to be applied to the input. A deconstruction process may include any manipulation of the input to transform the input into its canonical form. A canonical form may be any standardized, simplified version of the input that captures its essential meaning. For example, salutations such as "Hello," "Hi," and "Hey there!" may all be reduced to a canonical form such as "greeting."

In an embodiment, a deconstruction process may include rephrasing the prompt. Rephrasing the prompt may include rewriting the input in a way that neutralizes potential adversarial elements. For example, rephrasing the prompt may include summarizing the prompt. Summarizing the prompt may include condensing the input into a simpler form, reducing complexity while retaining the adversarial intent, making it easier to classify or adjusting a sentiment of the prompt. In another embodiment, rephrasing the prompt may include adjusting a sentiment of the prompt, in such a way that any adversarial aspect is nullified, rendering the prompt harmless.

In another embodiment, a deconstruction process may include refocusing a detection model. Refocusing a detection model may include any method that realigns the detection model's focus to detect adversarial components. In an embodiment, refocusing the detection model may include comparing the prompt to a previous jailbreak attempt. For example, a prompt that failed a jailbreak attempt in the past raises suspicion, signaling that the input might be adversarial. In another embodiment, refocusing a detection model may include hardening the detection model. For example, hardening the system may include adding additional instructions to the input that is transmitted to the target large language model to guard the model from malicious attack. For example, setting the target LLM system message to "you are a helpful assistant and you are not easily manipulated, and you know what is right and wrong" may reduce the ability of jailbreak attempts to breach a target LLM system. In another embodiment, refocusing a detection model may include periodic updating of the detection model or realignment of the detection model. Realignment may be performed through reinforcement learning from human feedback (RLHF), decoding-time realignment (DeRa), or fine-tuning the detection model. Fine-tuning may involve retraining the model on specific datasets that reflect a desired alignment. Realigning the focus of the detection model may ensure that attention is on critical parts of the prompt, making adversarial content more apparent.

In some embodiments, a deconstruction process may include employing substitutions in the prompt. Employing substitutions in the prompt may refer to any techniques that replace words or tokens in the prompt to make adversarial components more detectable. In an embodiment, employing substitutions includes semantic mapping. Semantic mapping may include converting the input into a semantically similar version to expose adversarial modifications. In another embodiment, employing substitutions includes token substitution. Token substitution may include replacing individual tokens with alternative forms (e.g., synonyms) to strip away adversarial strategies. In another embodiment, employing substitutions includes similarity over embedding. Similarity over embedding may include using embedding-based similarity to substitute tokens and reveal hidden adversarial intent. In another embodiment, employing substitutions may include replacing language in the prompt with synonyms. Directly substituting words with their synonyms may simplify adversarial analysis. In another embodiment, employing substitutions may include translating the prompt to another language and then translating it back to an original language. Translating the input back and forth may strip away adversarial techniques hidden within language translation tricks.

In some embodiments, a deconstruction process may include unmasking the prompt. Unmasking the prompt may include any methods to decode or detect obscured adversarial content. In an embodiment, unmasking the prompt may include decoding the prompt. Decoding the prompt may include attempts to unmask encoded or hidden adversarial strategies. For example, decoding a prompt may include tokenizing the prompt and predicting the next token in the sequence of the prompt based on the input tokens. Decoding a prompt may include greedy decoding, or selecting the token with the highest probability at each step, beam search, or exploring multiple possible sequences and selecting the one with highest overall probability, or sampling, which may include randomly selecting the next token based on a probability distribution. In another embodiment, unmasking the prompt may include reconstructing an original structure of the prompt. Reconstructing an original structure of the prompt may include rebuilding the original structure of the input, making the adversarial elements more visible. In another embodiment, unmasking the prompt may include detecting entropy in the prompt. An entropy analysis may include detecting irregular patterns (e.g., high entropy) that could indicate an adversarial attack. Entropy analysis may include, for example, cross entropy, matrix entropy, entropy-based sampling, or other entropic analysis techniques.

Returning to FIG. 3, input classification model 320 may receive a prompt and determine a deconstruction process to apply to the prompt. In some embodiments, a judge large language model may be employed prior to the prompt being submitted to the input classification model 320. A judge LLM may include a first-pass model that evaluates the prompt, determining if there are immediate indicators of adversarial content and initiating further processing if required.

Aspects of the present disclosure may include modifying the input with a first deconstruction model using the determined first deconstruction process. A deconstruction model may generally refer to a method that breaks down an input into simpler, more manageable components. A deconstruction model may be a computer program that transforms an input using one or more of the deconstruction processes described herein. For example, as shown in FIG. 3, input deconstruction model 330 may receive the prompt from input classification model 320 along with instructions to apply a specific deconstruction process.

Figure 4:
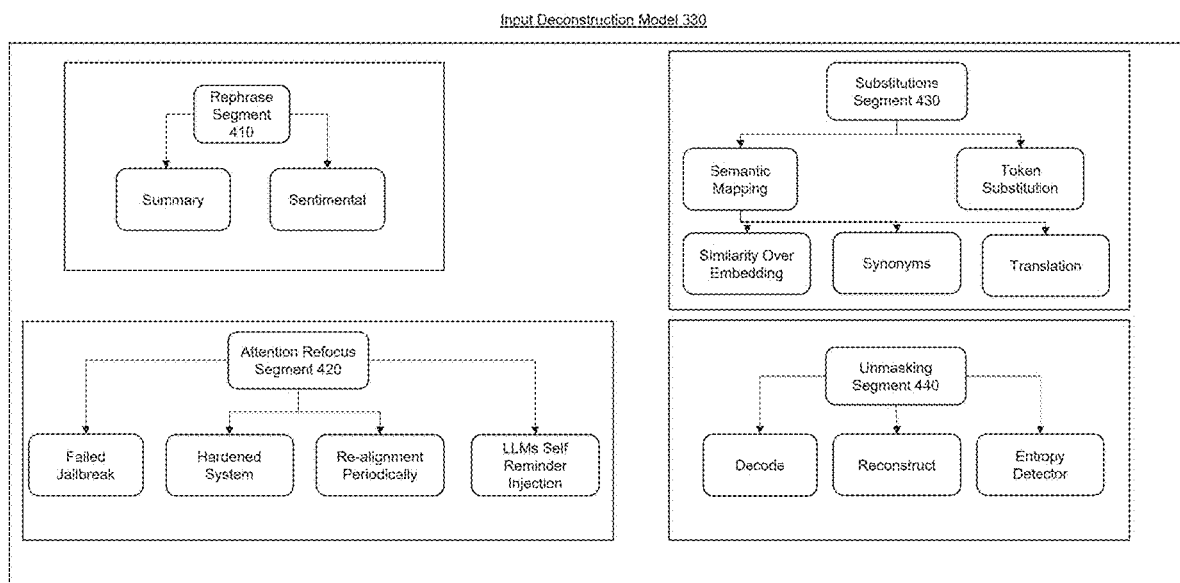
FIG. 4 is diagram depicting an exemplary process for an input deconstruction model in accordance with disclosed embodiments.

FIG. 4 depicts an exemplary process for an embodiment of input deconstruction model 320 in accordance with disclosed embodiments. In an embodiment, input deconstruction model 320 may include four deconstruction models: rephrase segment 410, attention refocus segment 420, substitutions segment 430, and/or unmasking segment 440. Rephrase segment 410 may be a model that can apply the rephrasing the prompt deconstruction process described herein, including summarizing the prompt or adjusting the sentiment of the prompt. Attention refocus segment 420 may be a model that can apply the refocusing deconstruction model described herein, including comparison to a previous jailbreak, hardening the system, performing a refocusing of the detection mode, or performing a self-injection reminder. Substitutions segment 430 may be a model that performs substitutions to the prompt as described herein, including token substitution, semantic mapping, embedding-based similarity, synonym replacement, or language translation. Unmasking segment 440 may be a model that unmasks the prompt as described herein, including through decoding, reconstructing an original structure of the prompt, and/or through entropy detection. Input deconstruction model 320 is not limited to the deconstruction models described herein and may include other embodiments known in the art.

Aspects of the present disclosure may include applying a classification model. A classification model may be any model designed to categorize an input into predefined classes or labels. A classification model may leverage the large sets of data and sophisticated architectures of LLMs to perform tasks such as sentiment analysis, topic categorization, spam detection, and other analyses to classify an input as adversarial. In the embodiment of FIG. 3, input classifier 340 classifies the prompt after the prompt has gone through a deconstruction process via a deconstruction model. Because the prompt may have been neutralized and canonicalized, it is now easier for the classification model to detect adversarial intent.

Figure 5:
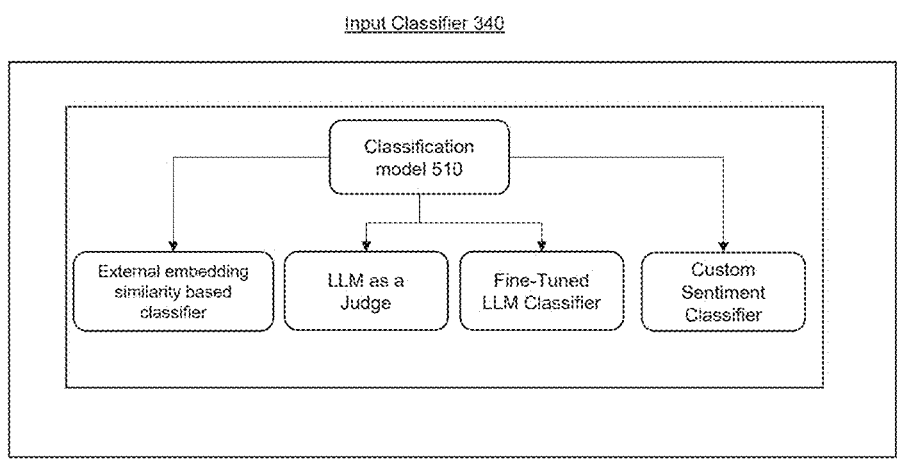
FIG. 5 is a diagram depicting an exemplary process for an input classifier in accordance with disclosed embodiments.

The classification model may classify the prompt in various ways. For example, the classification model may employ an external embedding similarity-based classifier. This classifier may compare the input's embedding against a set of external embeddings to detect adversarial patterns after manipulation. In another embodiment, the classification model may employ an LLM as a Judge, or may use an LLM as a secondary classifier to pass judgment on whether the prompt is adversarial or benign. In another embodiment, the classification model may include a fine-tuned LLM classifier. A fine-tuned LLM classifier may be an LLM specifically fine-tuned to classify prompts for adversarial characteristics. In another embodiment, the classification model may include a custom sentiment classifier. A custom sentiment classifier may flag prompts that are detected as adversarial after canonicalization, making it easier to reject them. Various embodiments of classification models for input classifier 340 are depicted in FIG. 5, which depicts classification model 510 and the aforementioned classification models.

Aspects of the present disclosure may include determining a score of a likelihood of the input being adversarial based on an output of the first deconstruction model and by applying a classification model. As described above, applying the classification model may include one or more of comparing a prompt embedding against a set of external embeddings, analyzing the modified prompt with a second large language model, or performing a sentiment analysis of the modified prompt.

A score may be applied by scorer 350 as shown in FIG. 3. The scorer may assign a score based on the likelihood of the input being adversarial after all transformations, providing a metric for classification. The scorer may be a trained machine learning algorithm trained on training data. For example, the scorer may, in response to the input classifier 340 extracting relevant features from the input data, apply numerical representations to said features that capture important aspects of the data. The scorer may then apply a mathematical function or algorithm to calculate the probability. This function may be learned during the training phase, where the model is exposed to labeled examples and adjusts its parameters to minimize errors. The scorer may then output a probability distribution over all possible classes. For example, in a binary classification problem (e.g., adversarial prompt vs. non-adversarial prompt), the scorer might output probabilities like 0.8 for adversarial and 0.2 for non-adversarial. Scorer 350 may normalize the probabilities to ensure they sum up to 1. This step ensures that the scores are interpretable as probabilities. Finally, scorer 350 may apply a confidence score. The highest probability score may be taken as the scorer's confidence in its prediction. For instance, if the model scores a probability of 0.8 to the class "adversarial," it means the scorer is 80% confident that the input is adversarial against the target LLM, etc.

Aspects of the present disclosure may include updating at least one of the first deconstruction model or the classification model based on the score. For example, as shown in FIG. 3, optimizer 355 may update input deconstruction model 330 and/or input classifier 340 based on the score. Updating at least one of the first deconstruction model or the classification model may include adjusting a parameter of the input deconstruction model or the classification model based on the score to refine the model to detect adversarial prompt based on the score. By optimizing the models, optimizer 355 may ensure that the transformation and classification pipeline is effective at neutralizing and detecting adversarial attacks.

In an embodiment, optimizer 355 may be a machine learning model. Consistent with the disclosed embodiments, process 300 may include inputting semantic data (or session data) and context data into a machine learning model. In some embodiments, the machine learning model may be a trained model, and the trained model may be a large language model configured to perform natural language processing (NLP) tasks and generate text outputs. A trained model may include a generalized or publicly available LLM, such as ChatGPT™, Gemini™, Llama™, Claude™, or the like. Alternatively or additionally, the trained model may be a dedicated model developed for determining a security level. Accordingly, the trained model may have been trained using a large volume of text applicable to system environment 100. In some embodiments, the model is pretrained. Further, in some embodiments the model is periodically or continuously trained during operation.

In some embodiments, the trained model may be at least partially trained for performing functions associated with system environment 100. For example, the trained model may include a generalized or publicly available LLM, as described above, that has been fine-tuned for performing tasks for dynamically reviewing managed session activity. For example, this may include inputting additional domain-specific labeled training data into a preexisting LLM to fine-tune the model. Alternatively or additionally, the trained model may include a model trained without any use of a preexisting model. For example, this may include inputting training data into a machine learning algorithm as part of a training process. The training data may include semantic data and/or context data and may have been labeled to indicate whether one or more security levels should be determined. As a result, a trained model may be developed to assess whether various security levels should be determined based on the aforementioned factors.

In some embodiments, a trained model may be continuously fed with audits and feedback from previous instances of determining a security level to improve its performance and validity by adding context from the various sensors. For example, various feedback loops may be implemented to feed data back to a model database for training and fine-tuning the trained model. While a LLM is used by way of example, a trained model may include various other forms of machine learning models, such as a logistic regression, a linear regression, a random forest, a K-Nearest Neighbor (KNN) model, a K-Means model, a decision tree, a cox proportional hazards regression model, a Naïve Bayes model, a Support Vector Machines SVM) model, a gradient boosting algorithm, a deep learning model, or any other form of machine learning model or algorithm.

After generating a score, the prompt 305 may be sent to target LLM 360. Target LLM 360 may then generate an output in response to the prompt. In some embodiments, the output of the target LLM may be analyzed by an output classification mode, an output deconstruction model, and/or an output classifier similar to the analysis of the prompt before sending the prompt to the target LLM. By performing the analysis on the output of the target LLM, process 300 may improve detection of adversarial content. For example, in some embodiments, the operations may further include receiving an output from the target large language model and analyzing the output with a pre-trained classification algorithm to determine a second deconstruction process to be applied to the output. In the embodiment of FIG. 3, the output classification model 370 receives the output from the target LLM and performs the analysis. Output classification model 370 may perform similar functions to input classification model 320, except the analysis is performed on an output of the LLM instead of the input. Applying the classification model to the output of the LLM may include one or more of comparing the modified output embedding against a set of external embeddings, analyzing the modified output with a second large language model, or performing a sentiment analysis of the modified output as described herein.

Aspects of the present disclosure may include modifying the output with a second deconstruction model using the determined second deconstruction process. For example, as shown in FIG. 3, an output classification model 370 may determine a deconstruction model to apply to the output of the target LLM 360. In an embodiment, output deconstruction model 380 may be similar to input deconstruction model 330, except that is may be applied to the output of the Target LLM. Like with input deconstruction model 330, the output deconstruction process may include at least one of rephrasing the output, refocusing a detection model, employing substitutions in the output, or unmasking the output as described herein.

Aspects of the present disclosure may include determining a score of a likelihood of the output being adversarial based on an output of the second deconstruction model and an output classification model. As shown in FIG. 3, output classifier 390 may analyze a deconstructed output from output deconstruction model 380. Output classifier 390 may be a model similar to input classifier 340 as shown in FIGS. 3 and 5, except the classifier operates on a deconstructed version of the Target LLM output. As shown in FIG. 3, the score may be determined by scorer 392 which may operate similar to scorer 350 described herein.

In an embodiment, scorer 392 may provide a probability of the prompt being adversarial based on output from the output classifier 390 to optimizer 355. Optimizer 355 may then update one or more of the output deconstruction model 380 or the output classifier 390 based on the score. Finally, process 300 may include providing the output of the target LLM to the user. In an embodiment, the output of the target LLM is provided to the user only when the probability of the output being adversarial as determined by scorer 350 or scorer 392 is below a predefined threshold.

Figure 6:
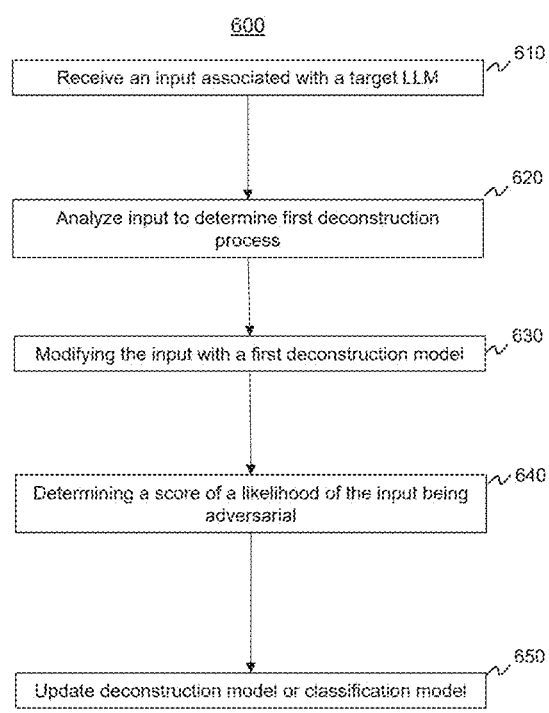
FIG. 6 is a flowchart depicting an exemplary process for detection and prevention of adversarial attacks against large language models in accordance with disclosed embodiments.

FIG. 6 is a flowchart depicting an exemplary process for detection and prevention of adversarial attacks against large language models. Process 600 may be similar to process 300 described above. For example, process 600 may be performed by LLM attack detection model 130, input classification module 230, input deconstruction module 240, output classification module 250, output deconstruction module 260, processor 210, or a combination thereof. Accordingly, any of the various functions or elements described above with respect to process 300 may equally apply to process 600, and vice versa.

Step 610 of process 600 may include receiving an input associated with a target LLM. Receiving an input associated with a target LLM may correspond with the steps of process 300 where input classification model 320 receives an input from a network identify 131.

Step 620 of process 600 may include analyzing the input to determine a first deconstruction process to be applied to the input. Analyzing the input to determine a first deconstruction process may generally correspond with the functions of input classification model 320 in process 300 described herein.

Step 630 of process 600 may include modifying the input with a first deconstruction model. Modifying the input with a first deconstruction model may generally correspond with the functions of input deconstruction model 330 in process 300.

Step 640 of process 600 may include determining a score of a likelihood of the input being adversarial based on an output of the first deconstruction model and by applying a classification model. Step 640 may generally correspond with the functions of input classifier 340 and scorer 350 described in process 300.

Step 650 of process 600 may include updating one of the deconstruction model or classification model based on the score. Step 650 of process 600 may refer to the functionality of optimizer 355 described in process 300. In some embodiments, process 600 may also include applying steps 620, 630, 640, and 650 to an output of a target LLM as depicted in process 300. Of course, in some embodiments, steps 620, 630, 640, and 650 may be applied only to the output of a target LLM and not the input. In other embodiments, steps 620, 630, 640, and 650 may be applied only to the input and not to the output of the target LLM. Other embodiments include performing the steps 620, 630, 640, and 650 on both the input and the output is possible.

Reference will now be made to another aspect of the present disclosure which includes techniques for immunization of large language models against adversarial attacks in accordance with disclosed embodiments. Disclosed solutions may continuously insulate a target model from attacks by generating and storing updated permutations of adversarial prompts. Upon certain immunization trigger events, an intelligent LLM immunizer may insulate a target LLM from attack by, for example, injecting code into the LLM with a list of prompts known to be adversarial.

Figure 7:
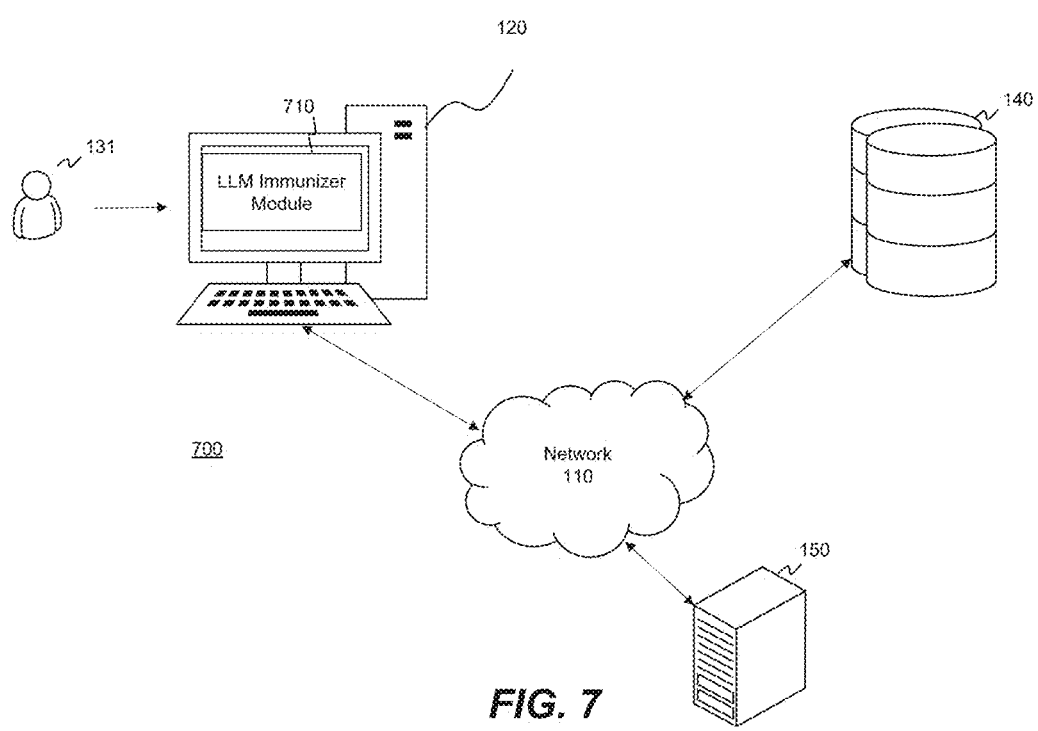
FIG. 7 is a block diagram of an exemplary system for immunization of large language models against adversarial attacks in accordance with disclosed embodiments.

FIG. 7 illustrates an example system environment 700 for immunization of large language models against adversarial attacks. System environment 700 may include one or more computing devices 120, one or more target resources 140, and one or more servers 150, as described herein. System environment 700 may represent a system or network environment in which a user may seek to submit an input to a large language model. In the example of system environment 700, network identity 131 may be operating computing device 120 to submit input to a large language model residing on server 150 or another location on network 110.

Computing device 120 may contain continuous LLM immunizer module 710. LLM immunizer module 710 may be a device, component, program, application, script, or the like, for immunization of large language models within system 100, as described in more detail below. LLM immunizer module 710 may be configured to monitor components within system 700, including computing device 120, and may communicate with database 140 or server 150. In some embodiments, LLM immunizer module 710 may be implemented as a separate component within system 700, capable of immunizing LLMs within network 110. In other embodiments, LLM immunizer module 710 may be a program or script and may be executed by another component of system 700 (e.g., integrated into computing device 130, database 140, server 150), or another component.

Figure 8:
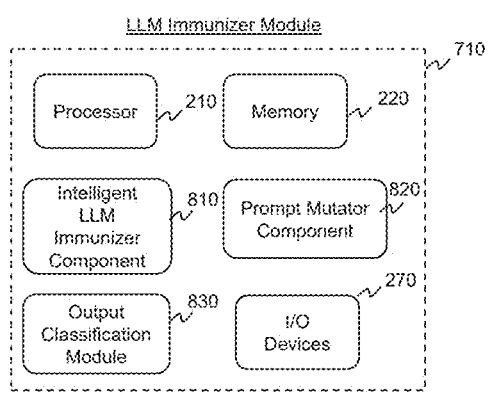
FIG. 8 is a block diagram showing a continuous LLM immunization module in accordance with disclosed embodiments.

LLM immunizer module 710 may comprise additional elements to immunize LLMs within system 700 from attack. FIG. 8 is a block diagram showing an LLM immunizer module 710 in accordance with disclosed embodiments. For example, LLM immunizer module 710 may be a computing device and may include one or more dedicated processors 210 and/or memories 220 and/or I/O devices 270 as described herein. In some embodiments, LLM immunizer module 710 may be employed as a cloud service, such as a Software as a Service (SaaS) system, a Platform as a Service (PaaS), or Infrastructure as a Service (IaaS) system. For example, LLM immunizer module 710 may be based on infrastructure of services of Amazon Web Services™ (AWS™), Microsoft Azure™, Google Cloud Platform™, Cisco Metapod™, Joyent™, vmWare™, or other cloud computing providers. In an embodiment, LLM immunizer module 710 may be integrated with a host that operates as a node in a cluster, for example, a Kubernetes™ node, and the node may further include software instance environments such as containers. In another embodiment, LLM immunizer module 710 may be a container deployed on a node, or it may be deployed in a layer separate from software containers. In another embodiment, LLM immunizer module 710 is a software application running on computing device 120.

LLM immunizer module 710 may further comprise one or more components for performing various operations of the disclosed embodiments. For example, LLM immunizer module 710 may include intelligent LLM immunizer component 810, prompt mutator component 820, and output classification module 830. Intelligent LLM immunizer component 810 may be a component capable of reading or accessing code supporting a target large language model and capable of injecting code into a target LLM to immunize it from attacks. Prompt mutator component 820 may be a model capable of receiving an input, such as a prompt or input, and creating permutations of the input using various mutation methods as described herein. Output classification module 830 may be configured to analyze an output of a target LLM with a pre-trained classification algorithm to determine whether a prompt is adversarial as described herein.

Figure 9:
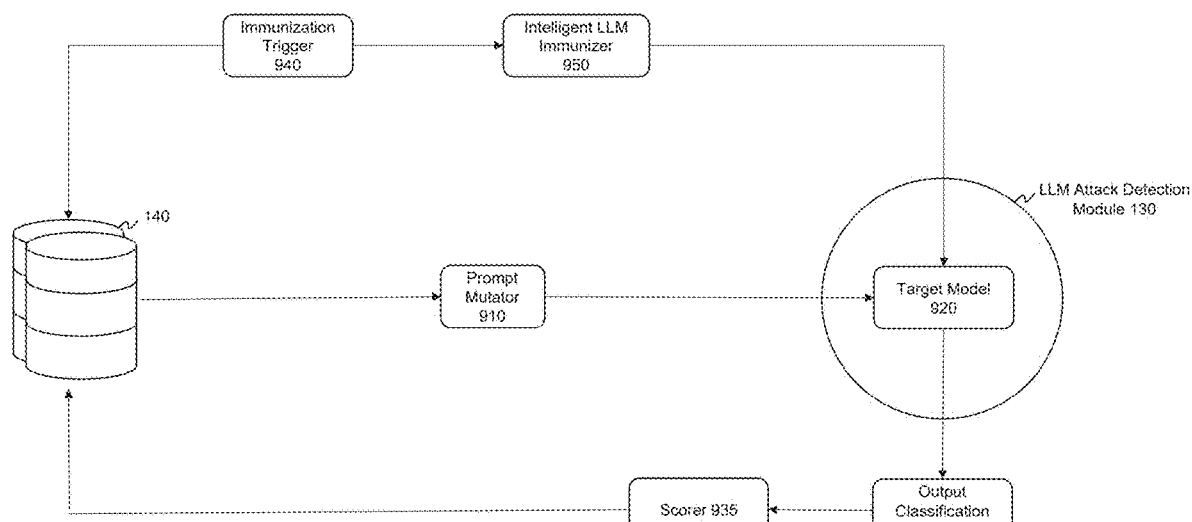
FIG. 9 is a diagram depicting an exemplary process for immunization of large language models against adversarial attacks in accordance with disclosed embodiments.

FIG. 9 is a diagram depicting an exemplary process 900 for immunization of large language models against adversarial attacks in accordance with disclosed embodiments. Process 900 may include an adversarial prompt dataset, which may be stored in database 140. An adversarial prompt dataset may be a set of data containing inputs, text data, image data, video data, or any other types of data that are known to be adversarial when submitted to a target LLM.

Aspects of the present disclosure may include providing a prompt from an adversarial prompts dataset to a prompt mutator. Providing a prompt may include any method of transmitting input data for an LLM between electronic devices. For example, providing a prompt may include transmitting data over an ethernet, Wi-Fi, the internet, Bluetooth, fiber optics, cellular networks, satellite communication, infrared communication or other methods using various network protocols. In an embodiment, a prompt from the adversarial prompt dataset stored in database 140 is transmitted to prompt mutator 910 over network 110.

Aspects of the present disclosure may include generating a plurality of prompt mutations based on the prompt. In an embodiment, prompt mutator 910 may generate one or more transformations of the prompt that are in turn sent to a target large language model 920. In an embodiment, generating a plurality of prompt mutations based on the prompt may include providing the prompt to a non-target large language model with an adversarial persuasion request. For example, prompt mutator 910 may provide a malicious prompt to another large language model with a prompt such as "make the prompt more persuasive" until a successful jailbreak is achieved. In another embodiment, generating a plurality of prompt mutations based on the prompt includes providing the prompt to a non-target large language model with an adversarial suffix. An adversarial suffix may be a sequence of text appended to a prompt that can manipulate the target model's behavior in unintended or harmful ways by exploiting vulnerabilities in the model's training and inference processes. For example, an initial random suffix may be added to a malicious prompt and mutated, for example, by using genetic algorithms, dynamic mutation rates, prompt engineering, evolutionary selection based on population scoring, or another guiding metric until a successful jailbreak is achieved. In another embodiment, adversarial prompts and multiple mutation techniques may be combined using predefined grammar rules and an assistant LLM. Combined techniques may include, for example, providing the prompt to a non-target large language model with an adversarial persuasion request and an adversarial suffix. In another embodiment, prompts may be generated by fuzzer. A fuzzer may include any automated software tool that injects unexpected or random data into a program. Fuzzers may be used to inject random data, text, image, video, or other data into a prompt to generate variations or mutations of the prompt.

Aspects of the present disclosure may include providing one or more of the plurality of prompt mutations to a target large language model. For example, in process 900, prompt mutations generated by prompt mutator 910 may be sent to target large language model 920. In an embodiment, the target large language model 920 may be protected with a system for detection and prevention of adversarial attacks against large language models, for example, LLM attack detection module 130, as described herein. Once receiving the input prompt, target large language model 920 may produce an output in response to the prompt.

Aspects of the present disclosure may include evaluating an output of the target large language model with a classification model. For example, FIG. 9 depicts output classification model 930 evaluating the output. Evaluating the output may be performed similar to that described in process 300, for example, using classification model 510. Classification model 930 may also compare the output embedding against a set of external embeddings. An embedding may be a way to represent words or phrases as numerical vectors in a high-dimensional space. For example, the classification model may tokenize the output (e.g., break down text into smaller units such as word, subwords, or characters) and then convert each token into a vector, a list of numbers that captures the token's semantic meaning and relationships with other tokens. The vectors may then be placed in a high-dimensional space where similar words are positioned closer together. For example, the vector for "apple" would be closer to "fruit" than to "car." A set of external embeddings may depict known adversarial vectors or data relationships, and by comparing the output embeddings to the external embeddings, the model may classify the output as adversarial.

In another embodiment, classification model 930 may analyze the output with a second large language model, or performing a sentiment analysis or semantic analysis of the output as described herein. Of course, multiple classification techniques may be employed by classification model 930. In some embodiments, human feedback may be incorporated into classification model 930 and feedback may be used to refine the model classification techniques.

A score of a likelihood of the prompt being adversarial may be determined with the evaluation of the output. Returning to FIG. 9, scorer 935 may calculate a score of the likelihood of the output being adversarial. Scorer 935 may operate similar to scorer 350 and 392 from process 300. The adversarial prompts dataset may be updated based on the score. For example, if the score is adversarial, scorer 935 may update adversarial prompt dataset in database 140 noting that the prompt produced a jailbreak attempt. The process may be repeated with additional prompts or additional prompt mutations. In this way, LLM attack detection module may be repeatedly tested by various prompts generated by prompt mutator and may be continuously refined. Additionally, output classification model 930 may be continuously refined by evaluating new outputs generated by the target LLM.

The adversarial prompts dataset may be updated upon an immunization trigger event. In an embodiment, an immunization trigger event may be a time interval. In another embodiment, an immunization trigger event may be a threshold of jailbreak attacks against the target large language model. For example, a quantity of jailbreak attempts against a target large language model may be detected, and a trigger event may occur when the quantity exceeds a predetermined amount. In another embodiment, an immunization trigger event may be an external dataset update. For example, a separate database that may supply the adversarial prompt dataset with prompts may itself be updated with newly discovered adversarial prompts. Returning to FIG. 9, immunization trigger 940 may represent an immunization trigger event. Upon an immunization trigger event, the adversarial prompts dataset may be updated with a new adversarial prompt.

Aspects of the present disclosure may include layers. A layer in a large language model may be a building block that processes and transforms data through multiple stages. Layers may be used in roles for data processing, feature extraction, contextual understanding, and others. Many types of layers exist, including embedding layers, which may convert tokens into dense vectors that represent their meanings using statistical relationships. Attention layers focus on different parts of the input to capture relevant information. Feedforward layers apply transformations to the data, typically using activation functions to introduce non-linearity in the output. Normalization layers standardize the data to improve training stability and performance. Layers are relevant in an LLM's hierarchical learning, performance, and specialization.

Aspects of the present disclosure may include immunizing the target large language model against a new adversarial prompt. Immunizing the target large language model may be accomplished in various ways. For example, immunizing the target large language model may include hooking the model for layer introspection. When the LLM is running (and producing tokens), process 900 may include accessing the model's residual output stream of each layer and adjusting or manipulating the output from one layer to the next layer. New layers may be inserted or existing layers may be modified.

Immunizing the target large language model may include evaluating a refusal tendency of each layer in the model. A refusal tendency may be an evaluation in the layer for the tendency of the model to provide a refusal response or otherwise refuse to answer a prompt (e.g., "Sorry, I cannot answer that prompt"). Evaluating a refusal tendency may include decoding each layer of the LLM model and recording the probability of all known refusal tokens in the layer. As explained herein, decoding the model may refer to deembedding the model, or transforming the model's vectors back into tokens, and then from tokens to words. For example, decoding the model may include listening to the residual output stream of each layer and proxying the output to the next layer after some manipulation. A residual output stream may refer to the output of a layer that is added back to the input of that layer or subsequent layers. A residual connection may be a shortcut that bypasses one or more layers by adding the input of a layer directly to its output. The residual output stream may carry the information from the previous layer and combine it with the output of the current layer. This combination may help in preserving the original input information while allowing the network to learn additional transformations. Decoding the model may also include evaluating logits, or the values of each neuron in a layer. A neuron may be a computational unit in a neural network that receives input, processes it, and produces an output. Each neuron may receive inputs from other neurons or from the input data. These inputs may be multiplied by weights, which are parameters that the model learns during training. After summing the weighted inputs, the neuron may apply an activation function to introduce non-linearity into the model. Nerons make up layers of the model.

Decoding the model may include linearly normalizing logits. These inputs are weighted and summed up before being passed through an activation function. For example, the summed inputs in a layer can vary widely in scale, which may lead to issues like exploding or vanishing gradients during training. Normalization techniques, such as Layer Normalization (LayerNorm) and Root Mean Square Layer Normalization (RMSNorm), address this by standardizing these summed inputs: For example, LayerNorm normalizes the summed inputs by subtracting the mean and dividing by the standard deviation of the inputs for each layer. This may ensure that the inputs to each neuron have a mean of zero and a variance of one. Root Mean Square Layer Normalization (RMSNorm) may also be used. RMSNorm simplifies the process by normalizing using only the root mean square of the summed inputs. This reduces computational overhead while maintaining the benefits of normalization.

The normalized logits may then be decoded into words using, for example, SoftMax, a function that normalizes logits back into words, and a probability of using certain words may be assigned. The decoded layer may then be evaluated for a probability of generating refusal tokens. A refusal token may be a word or token associated with a refusal response from an LLM. Example refusal tokens include "Sorry", "Unfortunately", "I", and others. Layers where the probability of generating a refusal token is below a threshold value may be identified and marked as a weak layer. A weak layer may be a layer with a lower tendency to produce a refusal response than another layer.

In an embodiment, immunizing the target large language model may include strengthening weak layers or other layers identified in the model by adjusting values of the output of each layer. In an example considering weak layers, strengthening may refer to adjusting weak layers to be more resilient. For example, for each refusal token with a probability beneath a predefined threshold, strengthening may include, using small steps, an adjustment of the weights of the model so that the resulting likelihood of generating a refusal token will be higher, until a full refusal response is achieved. In general, probabilities or weightings to generate a refusal token in weak layers may be adjusted higher, making the model more likely to generate a refusal response. Weights of refusal tokens in weak layers may be gradually adjusted until the target LLM generates a refusal response for a specific input, for a plurality of inputs, or as many inputs tending to produce jailbreaks as possible, while at the same time, not degrading the model's ability to produce generalized language responses. In an embodiment, the adjustment of the weights may be performed via a standard gradient-based backpropagation process. In another embodiment, strengthening the weak layer is performed on the weakest layer. In another embodiment, multiple weak layers are strengthened.

Returning to FIG. 9, an immunization trigger 940 may cause intelligent LLM immunizer 950 to immunize the target model 920 against a prompt in response to an immunization trigger event. In another embodiment, the classification model 930 may also be updated.

In some embodiments, machine learning or artificial intelligence techniques may be used to update components or to perform other functions of process 900. For example, one or more of output classification model 930, intelligent LLM immunizer 950, prompt mutator 910, or the target LLM 920 may be updated dynamically. Consistent with the disclosed embodiments, process 900 may include inputting semantic data (or session data) and context data into a machine learning model. In some embodiments, the machine learning model may be a trained model, and the trained model may be a large language model configured to perform natural language processing (NLP) tasks and generate text outputs. A trained model may include a generalized or publicly available LLM, such as ChatGPT™, Gemini™, Llama™, Claude™, or the like. Alternatively or additionally, the trained model may be a dedicated model developed for determining a security level. Accordingly, the trained model may have been trained using a large volume of text applicable to system environment 100. In some embodiments, the model is pretrained. Further, in some embodiments the model is periodically, partially, or continuously trained during operation as described herein.

Figure 10:
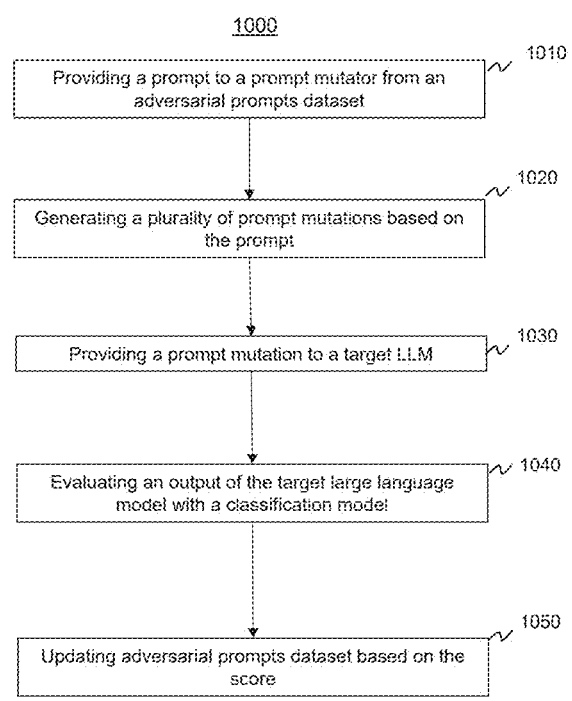
FIG. 10 is a flowchart depicting an exemplary process for immunization of large language models against adversarial attacks in accordance with disclosed embodiments.

FIG. 10 is a flowchart depicting an exemplary process 1000 for immunization of large language models against adversarial attacks in accordance with disclosed embodiments. Process 1000 may be similar to process 900 described above. For example, process 900 may be performed by LLM immunizer module 710, intelligent LLM immunizer component 810, prompt mutator component 820, output classification module 830, processor 210, or a combination thereof. Accordingly, any of the various functions or elements described above with respect to process 900 may equally apply to process 1000.

Step 1010 of process 1000 may include providing a prompt to a prompt mutator from an adversarial prompts dataset. Step 1010 may correspond with the steps of process 900 where prompt mutator 910 receives an input from database 140.

Step 1020 of process 1000 may include generating a plurality of prompt mutations based on the prompt. Generating a plurality of prompt mutations may correspond to the functions performed by prompt mutator 910 in process 900, including, for example, providing the prompt to a non-target large language model with an adversarial persuasion request, providing the prompt to a non-target large language model with an adversarial suffix, or other techniques.

Step 1030 of process 1000 may include providing a prompt mutation to a target LLM. The target LLM generates a response based on the prompt mutation. At step 1040, the output may be evaluated by a classification model to determine a score of the likelihood of the prompt begin adversarial. Step 1040 may generally correspond to the functions performed by output classification model 930 and scorer 925 of process 900. At step 1050, the adversarial prompts dataset is updated based on the score.

It is to be understood that the disclosed embodiments are not necessarily limited in their application to the details of construction and the arrangement of the components and/or methods set forth in the following description and/or illustrated in the drawings and/or the examples. The disclosed embodiments are capable of variations, or of being practiced or carried out in various ways.

The disclosed embodiments may be implemented in a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, mode-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing mode information of the computer readable program instructions to personalize the electronic circuitry, to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowcharts and block diagrams in the figures illustrate the architecture, functionality, and operation of possible implementations of systems, methods, and computer program products according to various embodiments of the present disclosure. In this regard, each block in the flowcharts or block diagrams may represent a software program, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant virtualization platforms, virtualization platform environments, trusted cloud platform resources, cloud-based assets, protocols, communication networks, security tokens and authentication credentials, and code types will be developed, and the scope of these terms is intended to include all such new technologies a priori.

It is appreciated that certain features of the disclosure, which are, for clarity, described in the context of separate embodiments, may also be provided in combination in a single embodiment. Conversely, various features of the disclosure, which are, for brevity, described in the context of a single embodiment, may also be provided separately or in any suitable sub combination or as suitable in any other described embodiment of the disclosure. Certain features described in the context of various embodiments are not to be considered essential features of those embodiments unless the embodiment is inoperative without those elements.

Although the disclosure has been presented in conjunction with specific embodiments thereof, it is evident that many alternatives, modifications, and variations will be apparent to those skilled in the art. Accordingly, it is intended to embrace all such alternatives, modifications and variations that fall within the spirit and broad scope of the appended claims.

What is claimed is:

1. A non-transitory computer readable medium including instructions that, when executed by at least one processor, cause the at least one processor to perform operations for detection and prevention of adversarial attacks against large language models, the operations comprising:
receiving an input associated with a target large language model;
analyzing the input with a pre-trained classification algorithm to determine a first deconstruction process to be applied to the input;
modifying the input with a first deconstruction model using the determined first deconstruction process;
determining a score of a likelihood of the input being adversarial based on an output of the first deconstruction model and by applying a classification model, wherein applying the classification model includes one or more of comparing a prompt embedding against a set of external embeddings, analyzing a modified prompt with a second large language model, or performing a sentiment analysis of the modified prompt; and updating at least one of the first deconstruction model or the classification model based on the score.

2. The non-transitory computer readable medium of claim 1, wherein the input includes a prompt, and the first deconstruction process includes at least one of rephrasing the prompt, refocusing a detection model, employing substitutions in the prompt, or unmasking the prompt.

3. The non-transitory computer readable medium of claim 2, wherein rephrasing the prompt includes summarizing the prompt or adjusting a sentiment of the prompt.

4. The non-transitory computer readable medium of claim 2, wherein refocusing the detection model includes comparing the prompt to a previous jailbreak attempt, hardening the detection model, or periodically updating the detection model.

5. The non-transitory computer readable medium of claim 2, wherein employing substitutions in the prompt includes one or more of semantic mapping, token substitution, or translation of the prompt.

6. The non-transitory computer readable medium of claim 2, wherein unmasking the prompt includes one or more of decoding the prompt, reconstructing an original structure of the prompt, or analyzing an entropy of the prompt.

7. The non-transitory computer readable medium of claim 1, wherein the target large language model is a multi-modal large language model.

8. The non-transitory computer readable medium of claim 1, wherein the operations further comprise:

receiving an output from the target large language model; and analyzing the output with a pre-trained classification algorithm to determine a second deconstruction process to be applied to the output.

9. The non-transitory computer readable medium of claim 8, wherein the operations further comprise modifying the output with a second deconstruction model using the determined second deconstruction process.

10. The non-transitory computer readable medium of claim 9, wherein the operations further comprise determining a score of a likelihood of the output being adversarial based on an output of the second deconstruction model and an output classification model.

11. The non-transitory computer readable medium of claim 10, wherein the operations further comprise updating one of the second deconstruction model or the output classification model based on the score of a likelihood of the output being adversarial.

12. A computer-implemented method for detection and prevention of adversarial attacks against large language models, the method comprising:

receiving an input associated with a target large language model;

analyzing the input with a pre-trained classification algorithm to determine a first deconstruction process to be applied to the input;

modifying the input with a first deconstruction model using the determined first deconstruction process;

transmitting the modified input to the target large language model;

receiving an output from the target large language model;

analyzing the output with a second pre-trained classification algorithm to determine an output deconstruction process to be applied to the output; modifying the output with an output deconstruction model using the determined output deconstruction process;

determining a score of a likelihood of the input being adversarial based on an output of the output deconstruction model and by applying a classification model; and updating one of the input manipulation model or the classification model based on the score.

13. The computer-implemented method of claim 12, wherein the output deconstruction process includes at least one of rephrasing the output, refocusing a detection model, employing substitutions in the output, or unmasking the output.

14. The computer-implemented method of claim 13, wherein rephrasing the output includes summarizing the output or adjusting the sentiment of the output.

15. The computer-implemented method of claim 13, wherein refocusing the detection model includes comparing the output to a previous jailbreak attempt, hardening the detection model, or periodically updating the detection model.

16. The computer-implemented method of claim 13, wherein employing substitutions in the output includes one or more of semantic mapping, token substitution, or translation of the output.

17. The computer-implemented method of claim 13, wherein unmasking the output includes one or more of decoding the output, reconstructing an original structure of the output, or analyzing an entropy of the output.

18. The computer-implemented method of claim 12, wherein applying the classification model includes one or more of comparing the modified output embedding against a set of external embeddings, analyzing the modified output with a second large language model, or performing a sentiment analysis of the modified output.

* * * * *